July 10, 1951  W. A. BEDFORD, JR  2,560,519
SHIFTABLE ROTARY STUD FASTENER
Filed Oct. 1, 1947
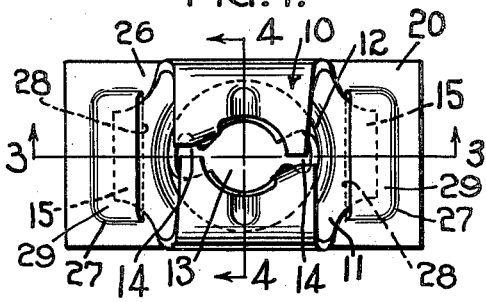
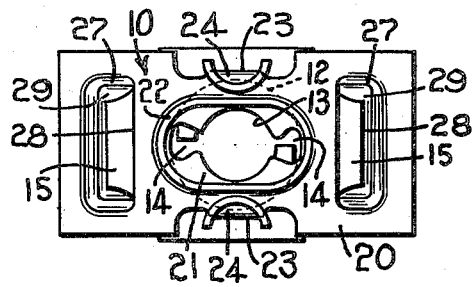
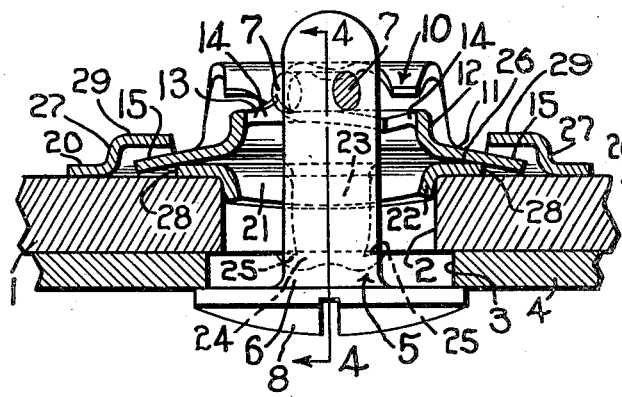
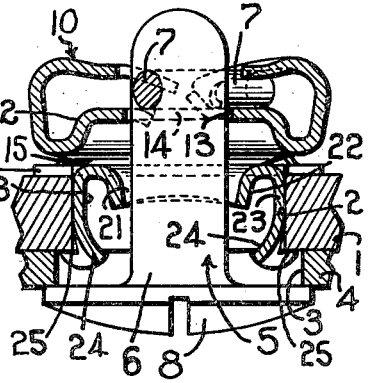
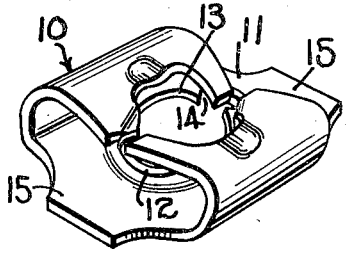
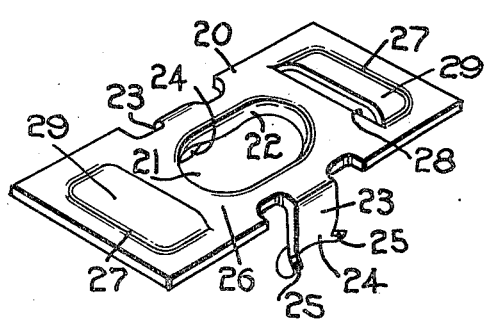
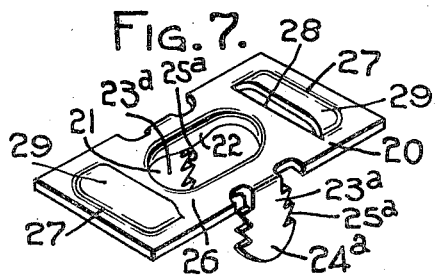
INVENTOR.
WILLIAM A. BEDFORD JR.
BY Philip E. Parker
ATTORNEY.

Patented July 10, 1951

2,560,519

UNITED STATES PATENT OFFICE 2,560,519

SHIFTABLE ROTARY STUD FASTENER

William A. Bedford, Jr., North Scituate, Mass., assignor to United-Carr Fastener Corporation, Cambridge, Mass., a corporation of Massachusetts Application October 1, 1947, Serial No. 777,241

7 Claims. (Cl. 24—221)

The present invention relates to fasteners, and more particularly, though not exclusively, to improved fasteners of the rotary stud and socket type, and aims generally to improve existing socket members for fasteners of that type.

One of the primary objects of the invention is the provision of a simple and novel fastener attaching or retainer member permitting the socket fastener member to be readily and securely attached to an apertured support.

A still further object of the invention is the provision of an improved fastener attaching member adapted to be readily and securely attached to an apertured support and adapted to shiftably retain an apertured fastener member, permitting the latter to be shifted relative to the aperture of the support to facilitate aligning the fastener aperture with a stud fastener member passed through the support aperture.

A still further object of the invention is the provision of a fastener attaching member having a resilient snap fastener member permitting its attachment to an apertured support by a direct snap fastener action.

The above and other objects and advantages of the invention will be apparent to persons skilled in the art from a consideration of the accompanying drawings and annexed specification, illustrating and describing a preferred construction embodying the invention.

In the drawings—

Fig. 1 is a top plan view of an assembled apertured fastener member and a retainer member according to one form of the invention;

Fig. 2 is a bottom plan view of the assembled fastener as illustrated in Fig. 1.

Fig. 3 is a vertical longitudinal sectional view, as taken on the line 3—3 of Fig. 1, and illustrating the assembled fastener attached to an apertured support and engaged by a cooperative stud fastener member mounted in a part to be supported;

Fig. 4 is a vertical transverse sectional view of the installation shown in Fig. 3, as taken on the line 4—4 of Figs. 1 and 3;

Fig. 5 is a perspective view of a typical fastener member suitable for use in the present invention;

Fig. 6 is a detail perspective view of an improved fastener attaching and retainer member according to the invention; and Fig. 7 is a perspective view of a slightly modified form of retainer plate.

Referring to the drawings, the improved fastener assembly is designed for application to a support 1 having an aperture 2, preferably circular in form, and adapted to receive a cooperating fastener 5 extending through an aperture 3 of a part 4 to be attached to the support 1.

The fastener member 10 of the assembly and the cooperating fastener element 5 may be of any suitable type commonly employed for the purpose of securing two apertured parts, such as 1 and 4, together. Preferably these fastener members are of the rotary stud or so-called cowl type in which the cooperating fastener element 5 is a rotatable stud, having a shank 6 extending through the aperture 3 and provided with radial arms 7 adapted to lockingly engage, upon partial rotation, an apertured seat portion of the fastener element 10. Such studs are usually provided at one end with an enlarged head 8 to engage a face of the part 4 to be supported, as well as provide a means for rotating the stud.

The apertured fastener member 10 of the assembly, which is engaged by the stud 5, may be of any suitable type and construction. For convenience, I have illustrated a fastener member 10 of the type and construction shown in the United States patent to Bedford No. 2,306,928 dated December 29, 1942. Such a fastener member 10 preferably comprises a continuous base portion 11 having an outwardly embossed seat 12 apertured as at 13 to receive the stud 5, said aperture having radial elongations 14 to permit passage of the radial stud arms 7. For a more detailed description of this fastener member 10 reference is made to the Bedford Patent No. 2,306,928, above stated. The base 11, however, preferably is provided with radial extensions 15 adapted to bear slidably upon a bearing surface of the attaching or retainer member.

The attaching or retainer member 20 (see Fig. 6) may advantageously be formed of an elongated strip of thin sheet metal and provided with an elongated central aperture 21 preferably having an inwardly turned marginal rim or flange 22. The length of the aperture 21 preferably equals the diameter of the support aperture 2 so that the flange 22 will engage the aperture walls at diametrically opposed points. The width of the aperture 22 may be substantially less than the diameter of the support aperture 2, and need only be slightly in excess of the diameter of the stud shank 6, it being understood that the radial arms 7 are disposed lengthwise of the aperture 2 when the stud 5 is being inserted for cooperative engagement with the fastener 10.

The means for attaching the retainer 20 to the support preferably comprises snap fastener members, and these are preferably in the form of fingers 23 disposed transversely of the plate 20 and in line with the minor axis of the retainer aperture 21. The fingers 23 are spaced apart a distance equal to the diameter of the support aperture and hence may be disposed inwardly of the marginal edges of the plate 20 and intermediate the bearing portions for the extensions 15 of the fastener member 10. The terminal ends of the fingers 23 are inwardly turned and outwardly cupped to present inwardly facing arcuate cam edge surfaces 24 extending from a point inwardly of the fingers and terminating in a shoulder 25 outwardly of the fingers. Thus, as the fingers 23 are forced through the support aperture 2, they yield inwardly by reason of the engagement of the cam edges 24 with the marginal edge of the support aperture 2, until the shoulders 25 pass the opposite face of the support, when the fingers snap outwardly and cause the shoulders 25 to lock against the face of the support. It will, of course, be understood that the length of the fingers, between the retainer plate 20 and the shoulders 25, will be equal to the thickness of the support.

If it is desired to replace the fastener assembly, the fingers may be moved inwardly by means of a suitable tool, for example pliers, to a point where the shoulders 25 are out of engagement with the support, whereupon the fingers may be drawn through the support aperture.

The portion of the retainer plate 20 surrounding the aperture 21 proivdes a bearing surface 26 for slidably supporting the base 11 of the fastener 10 and particularly the extensions 15 thereof. Beyond this bearing surface, and in alignment with the major axis of the aperture 21, are retainer means 27 adapted to overlie the end portions of the bearing extensions 15 of the fastener 10.

The retainer means are preferably dome shaped cups or pockets and may be formed by transversely slitting the material of the retainer plate 20, as along lines 28, and pressing the adjoining end portions 29 outwardly. The dimension of the outwardly pressed portions 29 is greater than the ends of the extensions 15, enabling the fastener 10 to float or be shifted in at least two directions to facilitate aligning the aperture 13 of the fastener with a stud inserted through the aperture 3 of the supported part 2.

In Fig. 7 there is illustrated a slightly modified form of the invention suitable for use with supports made of wood or like fibrous materials that may be penetrated by a driven fastening. In this form of the invention the fingers 23ª may be provided with a pointed end 24ª and serrated edges 25ª adapted to penetrate and resist withdrawal from wood or other fibrous supports. In such constructions, it is desirable that the attaching fingers 23ª be radially spaced from the support aperture, and hence they may be formed on the lateral side edges of the plate 20.

Although I have illustrated and described a preferred construction of fastener embodying the invention, I do not intend to be limited to the details thereof, as the scope of the invention is best defined in the appended claims.

I claim:

1. A fastener assembly comprising a fastener member having a base portion provided with a stud-receiving aperture, radial extensions on said base portion, means for securing said fastener to a support comprising a plate member having an aperture substantially in alignment with said stud-receiving aperture of said base portion, portions adjacent said aperture providing a support for said base portion and said radial extensions, longitudinally spaced outwardly cupped pockets on said plate presenting facing openings for slidably receiving said fastener radial extensions and transversely aligned integral means disposed on said plate intermediate said pockets for attaching said fastener assembly to an apertured support, said attaching means having cam-shaped terminal ends and outwardly extending shoulders adjacent said ends adapted for snap fastener engagement with an opposite face of an apertured support.

2. A fastener retainer member for shiftably attaching to an apertured support a fastener member having a base portion provided with opposed radial extensions, said retainer member comprising an elongated plate having a centrally disposed aperture and providing adjacent said aperture a slidable bearing surface for supporting the base portion of said fastener member, portions of said retainer member disposed on opposite sides of said aperture and spaced from said aperture being outwardly cupped to provide pockets on said plate opening adjacent said slidable bearing surface for receiving and overlying the terminal end portions of the radial extensions of said fastener member, and snap fastener attaching means integral with said plate disposed on opposite sides of the aperture thereof intermediate the outwardly cupped portions thereof for attaching said plate to an apertured support, said attaching means having cam-shaped terminal ends and outwardly extending shoulders adjacent said ends adapted for snap fastener engagement with a face of an apertured support opposite to the face thereof to be engaged by said elongated plate.

3. A fastener retainer member for shiftably attaching to an apertured support a fastener member having a base portion provided with opposed radial extensions, said retainer member comprising an elongated plate having a centrally disposed aperture and providing adjacent said aperture a slidable bearing surface for supporting the base portion of said fastener member, portions of said retainer member disposed on opposite sides of said aperture and spaced from said aperture being outwardly cupped to provide pockets on said plate opening adjacent said slidable bearing surface for receiving and overlying the terminal end portions of the radial extensions of said fastener member, and snap fastener attaching means integral with said plate disposed on opposite sides of the aperture thereof intermediate the outwardly cupped portions thereof for attaching said plate to an apertured support, said attaching means comprising resilient fingers provided with cam-shaped terminal ends adapted to engage a support aperture wall.

4. A fastener retainer member for shiftably attaching to an apertured support a fastener member having a base portion provided with opposed radial extensions, said retainer member comprising an elongated plate having a centrally disposed aperture and providing adjacent said aperture a slidable bearing surface for supporting the base portion of said fastener member, portions of said retainer member disposed on opposite sides of said aperture and spaced from said aperture being outwardly cupped to provide pockets on said plate opening adjacent said slidable bearing surface for receiving and overlying the terminal end portions of the radial extensions of said fastener member, and snap fastener attaching means integral with said plate disposed on opposite sides of the aperture thereof intermediate the outwardly cupped portions thereof for attaching said plate to an apertured support, said attaching means comprising resilient fingers provided with cam-shaped terminal ends and outwardly extending shoulders adjacent said ends spaced from said plate and adapted for snap fastener engagement in an aperture of a support.

5. A fastener retainer member for shiftably attaching to an apertured support a fastener member having a base portion provided with opposed radial extensions, said retainer member comprising an elongated plate having a centrally disposed aperture and providing adjacent said aperture a slidable bearing surface for supporting the base portion of said fastener member, portions of said retainer member disposed on opposite sides of said aperture and spaced from said aperture being outwardly cupped to provide pockets on said plate opening adjacent said slidable bearing surface for receiving and overlying the terminal end portions of the radial extensions of said fastener member, and snap fastener attaching means integral with said plate disposed on opposite sides of the aperture thereof intermediate the outwardly cupped portions thereof for attaching said plate to an apertured support, said plate aperture being elongated and provided with an inwardly turned flange adapted to engage a support aperture wall at diametrically opposed points, and said attaching means comprising resilient fingers adapted to engage said support aperture wall intermediate said diametrically opposed points.

6. A fastener retainer member for shiftably attaching to an apertured support a fastener member having a base portion provided with opposed radial extensions, said retainer member comprising an elongated plate having a centrally disposed aperture and providing adjacent said aperture a slidable bearing surface for supporting the base portion of said fastener member, portions of said retainer member disposed on opposite sides of said aperture and spaced from said aperture being outwardly cupped to provide pockets on said plate opening adjacent said slidable bearing surface for receiving and overlying the terminal end portions of the radial extensions of said fastener member, and snap fastener attaching means integral with said plate disposed on opposite sides of the aperture thereof intermediate the outwardly cupped portions thereof for attaching said plate to an apertured support, said attaching means comprising resilient fingers adapted to engage a support aperture wall and disposed inwardly of the marginal side edges of said retainer plate and extending substantially normal thereto.

7. A fastener retainer member for shiftably attaching to an apertured support a fastener member having a base portion provided with opposed radial extensions, said retainer member comprising an elongated plate having a centrally disposed aperture and providing adjacent said aperture a slidable bearing surface for supporting the base portion of said fastener member, portions of said retainer member disposed on opposite sides of said aperture and spaced from said aperture being outwardly cupped to provide pockets on said plate opening adjacent said slidable bearing surface for receiving and overlying the terminal end portions of the radial extensions of said fastener member, and snap fastener attaching means integral with said plate disposed on opposite sides of the aperture thereof intermediate the outwardly cupped portions thereof for attaching said plate to an apertured support, said plate aperture being elongated and provided with an inwardly turned flange adapted to engage a support aperture wall at diametrically opposed points, and said attaching means comprising resilient fingers spaced apart a distance substantially equal to that between said diametrically opposed points and adapted to engage said support aperture wall intermediate said points.

WILLIAM A. BEDFORD, Jr.

REFERENCES CITED

The following references are of record in the file of this patent:

UNITED STATES PATENTS

| Number | Name | Date |
|---|---|---|
| 1,768,505 | Carr | June 24, 1930 |
| 1,912,100 | Rosenberg | May 30, 1933 |
| 2,184,783 | Tinnerman | Dec. 26, 1939 |
| 2,230,916 | Tinnerman | Feb. 4, 1941 |
| 2,356,412 | Jones | Aug. 22, 1944 |
| 2,407,816 | Churchill | Sept. 17, 1946 |
| 2,456,559 | Johnson | Dec. 14, 1948 |